Figure 1:
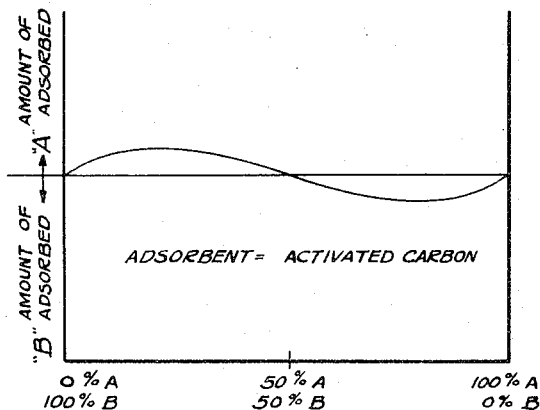

Aug. 8, 1950     A. E. HIRSCHLER     2,518,236

SEPARATION OF AROMATIC HYDROCARBONS

Filed May 10, 1947

INVENTOR.
ALFRED E. HIRSCHLER
BY
Busser and Harding
ATTORNEYS

Patented Aug. 8, 1950

2,518,236

UNITED STATES PATENT OFFICE 2,518,236

SEPARATION OF AROMATIC HYDROCARBONS

Alfred E. Hirschler, Drexel Hill, Pa., assignor to Sun Oil Company, Philadelphia, Pa., a corporation of New Jersey Application May 10, 1947, Serial No. 747,277

9 Claims. (Cl. 260—674)

1

This invention relates to the separation of hydrocarbons of the aromatic type. The invention is particularly directed to a method of preparing an aromatic hydrocarbon of high purity from a mixture containing one or more other aromatic hydrocarbons having the same number of double bonds per molecule as the desired hydrocarbon by means of selective adsorption with activated carbon as the adsorbent.

It is known that aromatic hydrocarbons may be separated from non-aromatic hydrocarbons by selective adsorption on activated carbon. It is also known that among the aromatic hydrocarbons separation may be effected to an extent by this method between hydrocarbons having different numbers of aromatic rings per molecule. For example, it is recognized that bicyclic aromatics generally are more strongly adsorbed by activated carbon than monocyclic aromatics and that tricyclic aromatics are still more strongly adsorbable. However, little if any practical utility has been made of such known differences in adsorbabilities, since the separation of aromatics according to the number of rings per molecule usually may readily be accomplished by means of distillation.

On the other hand, it has been presumed heretofore that aromatics which have the same number of double bonds per molecule, as where the number and type of rings (i. e. condensed or uncondensed) are the same, will not exhibit sufficient differences in adsorbabilities to make a separation by the adsorption method practicable. Particularly has this been considered to be the case where the aromatic hydrocarbons are isomers or adjacent homologues. It is in just such cases, however, that a suitable means of separating the hydrocarbons is most desirable, since it is in such cases that distillation is ineffective to make a good separation between the hydrocarbons due to the proximity of their boiling points.

I have now found that aromatic hydrocarbons, even though they have the same number of double bonds per molecule, nevertheless have sufficiently different adsorbabilities under certain conditions to be separable by selective adsorption on activated carbon. Although it is true in some cases that two aromatics having the same number of double bonds per molecule or the same degree of unsaturation will be adsorbed to about the same extent from a mixture when they are present in certain definite proportions, this will not be true when the two aromatics are present in proportions substantially different from said definite proportions. I have found that it is

2 always possible to effect a separation by selective adsorption on activated carbon if a starting mixture is selected in which the proportions of the components are such that their adsorbabilities are substantially different. The present invention thus provides a means of purifying an aromatic containing one or more other aromatics which boil so close to the desired aromatic as to render purification by distillation impracticable.

In some cases two aromatics which have the same degree of unsaturation will be adsorbed from the mixture to about the same extent when they are present in about equal proportions or at least in proportions which are not greatly different; whereas when such hydrocarbons are present in greatly different proportions, either component may be purified dependent upon which of the components is present in small amount in the starting mixture. I have found that with hydrocarbon pairs of this type the hydrocarbon which is present in small amount is selectively removed. Further, I have found that the smaller the amount of the hydrocarbon the more easily its removal may be effected, which is in contrast to other separation methods such as distillation or solvent extraction wherein the separation becomes more difficult as the amount of a component decreases.

With many pairs of such aromatics, I have found that binary mixtures are obtained from which one of the components will be preferentially adsorbable at substantially all concentrations or at least at all concentrations except where the component is extremely pure. This component therefore may be selectively removed from the mixture substantially regardless of the proportions of the hydrocarbons. Most aromatic mixtures appear to behave in this manner when the adsorbent is activated carbon.

In other cases pairs of such aromatic hydrocarbons will exhibit a behavior intermediate of the above two cases; that is, one component will be preferentially adsorbed throughout a large part of the concentration range while the other component will be preferentially adsorbable over only a small although substantial part of the range. With pairs of this type a mixture containing the large amount of first component and the small amount of second component will not be separable by adsorption, but mixtures in which the proportions are substantially different from this will be separable.

With any given pair of aromatics having the same number of double bonds per molecule and particularly when the total number of carbon atoms per molecule present in alkyl substituent groups does not differ greatly, it has not been possible thus far to predict in every case which type of behavior will be exhibited, although it has been found that in the majority of cases one of the aromatic components will be preferentially adsorbed by activated carbon throughout substantially the whole concentration range. Generally, it is desirable to predetermine the effect of proportions on relative adsorbabilities. From this it may be ascertained within what composition range the starting material should lie in order that its components may be purified in accordance with the invention.

Figure 2:
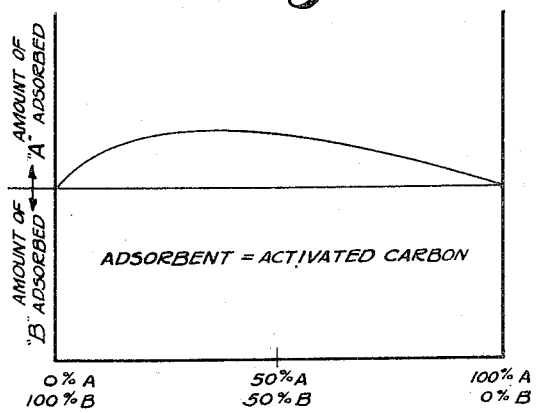
Figure 3:
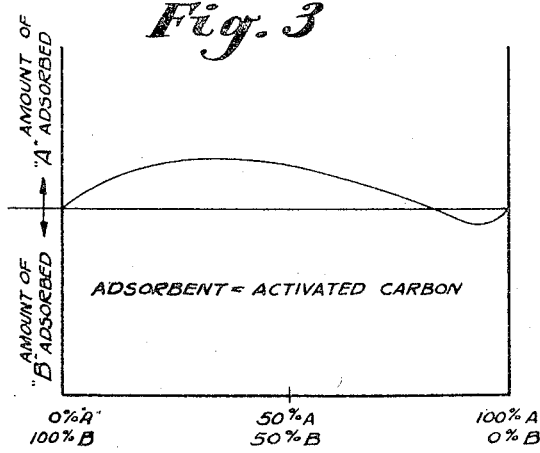

The accompanying drawings are schematic illustrations of the types of behavior of hydrocarbon pairs as discussed above. Figure 1 is representative of the type of adsorption isotherm obtained for certain closely related hydrocarbon pairs throughout the complete composition range of 0 to 100% for each component, when the components are the type that have about the same adsorbabilities when the two are present in certain definite proportions that are not greatly different. Figure 2 is representative of the adsorption isotherm when one component is selectively adsorbable throughout substantially the whole concentration range. Figure 3 represents an intermediate type of behavior exhibited by some pairs of aromatics. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

With the type of behavior as shown in Figure 1, when the two components, A and B, are present in certain definite proportions which are not greatly different, neither is preferentially adsorbed from the mixture. On the other hand, when A is present in small proportion, it is selectively adsorbed; and when B is the component present in small amount, it is the one that is selectively removed. Either component may therefore be prepared in a highly purified state by selecting as starting material a mixture containing a large amount of the desired component and a small amount of the other component, for example, by utilizing a technical grade of the desired material as the charge stock. Thus, the A component may be prepared in a highly pure form by treating a mixture of this compound, containing as impurity say 20% or less of the B component, with activated carbon to selectively remove B from the mixture. In like manner the B component may be prepared in relatively pure form from a mixture in which it is the constituent which is present in large amount.

When the behavior is of the type shown in Figure 2 where the A component is selectively adsorbed over substantially the whole concentration range, it is possible to start with practically any concentration and remove A from the mixture. Thus, by treating any mixture of A and B with an adsorbent such as activated carbon, A may be selectively removed and B may be obtained as a highly purified product. Also, by desorbing the A component from the used adsorbent, it may be obtained in more concentrated form and even in relatively pure form if the treatment is applied in suitable procedural steps. It appears that most pairs of aromatic hydrocarbons exhibit the type of behavior on activated carbon as illustrated by Figure 2.

Figure 3 represents an intermediate type of behavior in which the A component is the more adsorbable over most of the concentration range while the B component is more adsorbable throughout only a small although substantial part of the range, for example, when it is present in concentrations of the order of 15% or less. With mixtures of this type the B component may readily be prepared in highly pure form, but a substantial purification of the A component is not so easy to accomplish, although it may be done according to the present method, particularly when the starting material contains a high concentration, say 97% or 98%, of this component to begin with and it is desired to effect further purification.

In practicing the invention, a charge material is selected which contains the hydrocarbons in proportions at which their adsorbabilities are substantially different and this material is treated with activated carbon or a like adsorbent to selectively adsorb one of the components. In order to effect a high degree of separation, this treatment is carried out preferably by percolating the charge through a column of the adsorbent while employing a large proportion of the adsorbent. After all of the charge has passed into the adsorbent, it may be followed by a suitable desorbing agent (for example, an aromatic hydrocarbon having a greater number of aromatic rings per molecule than the charge hydrocarbons) to displace the adsorbate. Desorption may also be accomplished, if desired, by using a non-polar liquid such as a saturated hydrocarbon in sufficiently large amount to displace the adsorbate and thereby reactivate the adsorbent for re-use in the process. The use of a desorbing agent is necessary where the desired component is the one which is selectively adsorbed. In the case where the desired component is not preferentially adsorbed and therefore appears in highest purity as the first portion of efflux or filtrate from the column, a desorbing agent is not necessarily required provided sufficient charge is used to wet all of the adsorbent and produce a filtrate. In either case the efflux from the column is collected in separate fractions as desired in order to segregate the portion which has the desired purity.

With hydrocarbons that behave as illustrated in Figure 1, the first portion of efflux or filtrate will comprise the predominant component in a relatively high state of purity as compared to the charge. Succeeding portions will decrease in purity and, as the adsorbate is displaced from the carbon, the filtrate will become less pure than the charge. However, with this type of system the other component (i. e. the one present in small amount in the charge and preferentially adsorbed therefrom) will never appear in relatively high concentration but only in concentrations below that at which the two components have about the same adsorbabilities.

With the type of system as illustrated by Figure 2, the first portion of filtrate will be relatively rich, as compared to the charge, in the less adsorbable component regardless of the charge composition. Succeeding portions will become less and less rich in this component, eventually becoming enriched with respect to the more adsorbable component as it is displaced from the gel by means of the desorbing agent. Thus it is possible to obtain one component in concentrated form as the first portion of filtrate and also to obtain the other component in enriched form as the last portion of filtrate. The degree of separation will depend to some extent upon the amount of adsorbent used.

When the system is the type shown in Figure 3, the first portion of filtrate will be rich with respect to the less absorbable component and the succeeding portions will vary in composition generally as described for systems as in Figure 2. However, although it will be possible to obtain the more adsorbable component in enriched form as the last portions of filtrate, this constituent will never appear in a very high state of purity.

The following examples, in which percentages are given on a molar basis unless otherwise stated, illustrate the invention more specifically:

Example I

A mixture consisting of 97.8% ethylbenzene and 2.2% o-xylene was percolated through a small column containing 120 grams of activated carbon. The column was provided with a water jacket through which water was continuously circulated at a temperature of about 55–60° F. to absorb heat generated due to wetting of the adsorbent. A total of 73 ml. of the charge material was passed into the adsorbent, and this was followed by α-methylnaphthalene which served as a desorbing agent to displace the charge hydrocarbons from the adsorbent. The filtrate was collected in separate cuts and certain of the cuts were tested for purity by the freezing point method. The following tabulation shows what fraction of the charge these cuts represented and the purity of the cuts:

| Cut No. | Fraction of Charge (by vol.) | Concentration of ethylbenzene in Cut, volume per cent |
|---|---|---|
| | Per cent | |
| 1 | 0– 6.5 | 99.8 |
| 2 | 6.5–13.7 | 99.9 |
| 4 | 18.5–28.0 | 99.8 |
| 6 | 35.6–46 | 99.3 |
| 8 | 54.5–68 | 98.7 |

These results show that the o-xylene was selectively removed from the ethylbenzene and that ethylbenzene was thereby obtained in extremely pure form.

Example II

This example illustrates the separation of p-xylene from ethylbenzene. 78 ml. of a mixture of these constituents containing 97.35% ethylbenzene was treated with 120 grams of activated carbon in the manner described in Example I. A first cut representing 38% by volume of the charge was 98.5% pure ethylbenzene.

Example III

A mixture consisting of 90% benzene and 10% toluene by volume was treated by percolation through 120 grams of activated carbon at a temperature of about 50° C. in a manner similar to Example I except that no desorbing agent was used. The following results were obtained:

| Cut No. | Vol., ml. | Concentration of benzene in Cut, vol. per cent |
|---|---|---|
| 1 | 4 | 97 |
| 2 | 4.5 | 94.5 |
| 3 | 7 | 93 |

Example IV

This example illustrates the further purification of an aromatic which, before purification, represented the best grade commercially available. This material was bought as "chemically pure" m-xylene; but analysis showed that it was 98.5% pure, the impurity being other C₈ aromatics not specifically identified. One liter of this material was percolated through a 1" x 9' column containing 585 grams of activated carbon at a temperature of about 55–60° F. The first 9 ml. of filtrate had a purity of 99.65%. The cut representing the fraction of filtrate between 28 ml. and 43 ml. had a purity of 99.2%. The cut representing the fraction between 59 ml. and 78 ml. had a purity of 99.0%. These results show that, even though the starting material had a very high purity, a further substantial purification was effected.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used. Also, the adsorbent may be reactivated by desorbing the aromatics by means of a saturated hydrocarbon liquid. The boiling point of the saturated hydrocarbon preferably should be sufficiently different from that of the aromatic material so that the two may be readily separated by distillation after the desorption has been completed. The reactivated adsorbent may then be re-used for further treatment of the aromatic charge and the recovered saturated hydrocarbon may be re-used in a subsequent reactivation step.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

In my co-pending application, S. N. 660,076, filed April 6, 1946, now abandoned, there is described and claimed a method for separating aromatic hydrocarbons, which differs from the present method in that the adsorbent is silica gel. The activated carbon of the present method is an adsorbent of a different type and has properties that are non-analogous to those of silica gel. For example, activated carbon is organophilic whereas silica gel is hydrophilic. With some aromatic mixtures one of the aromatics may be the more strongly adsorbable when the adsorbent is silica gel, whereas the other aromatic component will be the more adsorbable one when activated carbon is used. Due to such differences activated carbon will in some cases give substantially improved results.

Various modifications of the herein described process are permissible within the broad aspect of the invention and will be apparent to those skilled in the art.

Having described my invention, what I claim and desire to protect by Letters Patent is:

1. A process for separating two aromatic hydrocarbons having the same number of double bonds per molecule and the same number of aromatic rings per molecule which comprises passing a liquid hydrocarbon mixture composed at least mainly of such aromatic components through a body of activated carbon, thereby selectively adsorbing one of said aromatic hydrocarbons, and separating from the activated carbon a filtrate fraction which contains only a portion of the total aromatics in the starting mixture, thereby obtaining a product in which the proportion of one of said hydrocarbons to the other is higher than in the starting mixture.

2. A process according to claim 1 in which there is also separated from the activated carbon another fraction in which the said proportion is lower than in the starting mixture.

3. A process according to claim 1 wherein said aromatic hydrocarbons are each alkyl benzenes.

4. A process according to claim 1 wherein said aromatic hydrocarbons are isomers.

5. A process according to claim 1 wherein said aromatic hydrocarbons are adjacent homologues.

6. A process for purifying an aromatic hydrocarbon which contains in admixture therewith a small amount of another aromatic hydrocarbon having the same number of double bonds per molecule and the same number of aromatic rings per molecule as the first mentioned aromatic hydrocarbon, the mixture being purified being substantially free of non-aromatic hydrocarbons, which comprises filtering the mixture in liquid phase through a body of activated carbon, thereby selectively adsorbing said other hydrocarbon which is present in small amount, and separating from the activated carbon a filtrate fraction containing the desired aromatic hydrocarbon in relatively pure state.

7. A process according to claim 6 wherein said aromatic hydrocarbons are each alkyl benzenes.

8. A process according to claim 6 wherein said aromatic hydrocarbons are isomers.

9. A process according to claim 6 wherein said aromatic hydrocarbons are adjacent homologues.

ALFRED E. HIRSCHLER.

REFERENCES CITED

The following references are of record in the file of this patent:

UNITED STATES PATENTS

| Number | Name | Date |
|---|---|---|
| 2,395,491 | Mavity | Feb. 26, 1946 |
| 2,425,535 | Hibshman | Aug. 12, 1947 |
| 2,448,489 | Hirschler | Aug. 31, 1948 |

OTHER REFERENCES

Crawley, J. Soc. Chem. Ind., 60, 205–207.